United States Patent
Jessup (10) Patent No.: US 7,436,302 B2
(45) Date of Patent: Oct. 14, 2008

(54) LOW COST RFID LABELING DEVICE

(76) Inventor: Steven C. Jessup, 4549 W. Moon Lake Dr., Meridian, ID (US) 83642-3955

( * ) Notice: Subject to any disclaimer, the term of this patent is extended or adjusted under 35 U.S.C. 154(b) by 515 days.

(21) Appl. No.: 11/284,597

(22) Filed: Nov. 21, 2005

(65) Prior Publication Data

US 2007/0030153 A1    Feb. 8, 2007

Related U.S. Application Data

(63) Continuation-in-part of application No. 11/208,220, filed on Aug. 19, 2005, now Pat. No. 7,295,118.

(51) Int. Cl.
- H04Q 5/22 (2006.01)
- G08B 13/14 (2006.01)
- G08C 19/00 (2006.01)
- B41J 5/30 (2006.01)
- B41J 11/44 (2006.01)
- G06F 19/00 (2006.01)
- G06K 19/06 (2006.01)

(52) U.S. Cl. ............ 340/572.1; 340/10.1; 340/10.51; 340/572.6; 340/572.7; 340/572.9; 340/825.69; 340/825.72; 400/61; 400/62; 400/70; 400/76; 235/385; 235/492

(58) Field of Classification Search ............ 340/10.1, 340/10.51, 572.1, 572.7, 572.9, 825.69, 825.72; 400/61, 62, 70, 76; 235/385, 492
See application file for complete search history.

(56) References Cited

U.S. PATENT DOCUMENTS

| | | | |
|---|---|---|---|
| 3,984,838 A | 10/1976 | Voronoff | |
| 4,360,810 A | 11/1982 | Landt | |
| 4,414,550 A | 11/1983 | Tresselt | |
| 4,506,267 A | 3/1985 | Harmuth | |
| 4,575,725 A | 3/1986 | Tresselt | |
| 5,649,296 A | 7/1997 | MacLellan et al. | |
| 5,943,016 A | 8/1999 | Snyder, Jr. et al. | |
| 6,169,474 B1 | 1/2001 | Greeff et al. | |
| 6,243,012 B1 | 6/2001 | Shober et al. | |
| 6,246,326 B1 * | 6/2001 | Wiklof et al. ............ 340/572.1 |
| 6,249,227 B1 | 6/2001 | Brady et al. | |
| 6,409,401 B1 | 6/2002 | Petteruti et al. | |
| 6,420,961 B1 | 7/2002 | Bates et al. | |
| 6,456,668 B1 | 9/2002 | MacLellan et al. | |
| 6,639,509 B1 | 10/2003 | Martinez | |
| 6,745,008 B1 | 6/2004 | Carrender et al. | |
| 6,765,476 B2 | 7/2004 | Steele et al. | |
| 6,779,246 B2 | 8/2004 | Debraal | |

(Continued)

OTHER PUBLICATIONS

International Search Report in corresponding PCT application, No. PCT/US06/32456.

Primary Examiner—George A Bugg
Assistant Examiner—Lam P Pham
(74) Attorney, Agent, or Firm—Stephen M. Nipper; Dykas, Shaver & Nipper, LLP (57) ABSTRACT

A system for dispensing, reading and verifying RFID tags. The system includes a label dispenser that dispenses labels that contain RFID tags from a bulk label storage device, an RFID Reader/Writer device that is operatively connected to the label dispenser. The RFID Reader/Writer device reads and codes tags which are embedded within these labels. The RFID Reader/Writer is configured to function in close range and thus provide adequate fidelity of coding and transfer of individual program tags. The invention also includes an RFID reader/writer that is powered by its communications means.

14 Claims, 6 Drawing Sheets

U.S. PATENT DOCUMENTS

| | | |
|---|---|---|
| 6,827,279 B2 | 12/2004 | Teraura |
| 6,868,073 B1 | 3/2005 | Carrender |
| 6,879,809 B1 | 4/2005 | Vega et al. |
| 6,899,476 B1* | 5/2005 | Barrus et al. .......... 400/76 |
| 6,929,412 B1* | 8/2005 | Barrus et al. .......... 400/76 |
| 7,037,009 B2* | 5/2006 | Barrus et al. .......... 400/76 |
| 7,073,712 B2* | 7/2006 | Jusas et al. .......... 235/451 |
| 7,190,270 B2* | 3/2007 | Brown et al. .......... 340/572.1 |
| 2002/0167397 A1 | 11/2002 | Eroglu et al. |
| 2005/0098620 A1* | 5/2005 | Dunlap .......... 235/375 |

* cited by examiner

LOW COST RFID LABELING DEVICE

CROSS-REFERENCE TO RELATED APPLICATIONS

This application claims priority from and is a Continuation-In-Part application of U.S. patent application Ser. No. 11/208,220 entitled LOW COST RFID SYSTEM filed by Steven Jessup on Aug. 19, 2005 now U.S. Pat. No. 7,295,118. The contents of this aforementioned application are hereby incorporated by reference.

FIELD OF THE INVENTION

The present invention generally relates to labeling and identification systems and more particularly to an RFID reader/writer and labeling device that can be utilized to dispense and program labels that contain RFID tags.

BACKGROUND OF THE INVENTION

Background Information. Radio Frequency Identification Systems (RFIDs) are used in a variety of industries to provide various types of information. This information may include information regarding the identity of the package, the location of the package, special handling instructions related to the package or its delivery, or a variety of other types of information related to these devices. A typical RFID system typically includes at least one active transmitting and receiving device commonly called a Reader/Writer or Interrogator and at least one passive or active target device, typically called a tag. The basic principal of such a system involves the transmission of radio frequency energy from the Reader/Writer to the tag. The tag receives the signal, modifies that energy and reflects this modified signal back to the reader, where this return signal is received, read and decoded.

RFID systems can be used in a variety of applications. One of the most common types of applications involves an embodiment where RFID tags are placed upon something that moves and a Reader is used by another party to interrogate a group of items such as packages to find a particular package which contains a particular tag.

The transmission of information and power between the reader and the tag is typically accomplished by the modulation of the RF carrier. Information is many times transferred using a backscatter technique. In this backscatter technique, radio frequency (RF) energy incident on the tag antennae is modulated by changing the impedance of the antenna and effectively changing the radar cross section (RCS) of the tag and the amplitude of the energy reflected back to the reader.

In other instances, the tag impedance is such that the tag absorbs the RF energy, which is then used to power the tag. The tag changes the antenna impedance following the timing requirements of the specific tag classification effectively increasing the reflectivity of the tag and amplitude of the backscattered carrier received at the Reader. In these systems, the reader provides power to passive tags by maintaining a constant RF carrier throughout the entire transaction with the tag.

In some circumstances, this constant sending of a signal combined with the backscattered response signals can be problematic particularly in applications where the reader is in close proximity to a plurality of tags or when the reader and the tags are in close contact with one another. This close association of the tags can cause the compression of signals as well as the compression of the modulated signals emanating from these tags. This results in signals that are difficult to separate or individually ascertain. This is particularly true of environments where the reader is also attempting to write information to this tag.

A variety of attempts to modify this information have been made with various levels of success, however providing a lost cost effective solution to the aforementioned problems has stood as a barrier to the wide spread use of such devices in various industries and channels of commerce.

What is needed therefore is a device that allows labels with RIFD tags to be dispensed and programmed from a single location. In order for this need to be met a RFID reader writer must exist that has sufficiently short range so as to program a single tag without affecting a plurality of tags that are located in another location. In addition, this device must be made of sufficiently low cost parts so as to make such a device commercially feasible.

SUMMARY OF THE INVENTION

The present invention is a system for dispensing and interacting with or "reading" labels that contain an RFID tag within these labels. In the following discussion for ease of simplicity the terms "read" or "reading" will be used to describe a variety of interactive activities that may or may not take place between a reader/writer or interrogator and a tag. Depending upon the particular capabilities of the tag these activities may include but are not limited to reading the tag, coding the tag, killing the tag, putting the tag to sleep, or any other of a variety of features that are particularly embodied by and premised upon the individual configuration of the tag. The invention includes a label dispenser that dispenses labels that contain RFID tags from a bulk label storage device such as a particular roll of labels. In the preferred embodiment of the invention these labels are printable labels. The invention also contains an RFID Reader/Writer device that allows for items placed upon this roll to be read.

The system employs a method whereby a user can activate and use the system of the present invention to dispense and read labels from a single location. This method of dispensing a label is commenced when a user initiates the dispensing label-printing device. This initiation of the label printing process may take place in a variety of ways, one of which being a party who is operating the device instructs the device to dispense a label. This instruction may also originate from the host computer or controller. When activated, the label-dispensing device dispenses a label that is moved out of the storage area to a reading area. To assist in the movement of the label from this storage area to the reading area a chute with a cover is placed along this passageway.

Upon arriving at the designated location, a sensor identifies that the label has arrived at this location and triggers the RFID reader/writer device to send signals that will identify the tag and then commence communication reading the tag which is located within the label.

Depending upon the exact configuration which is desired by the user, after a signal is sent to the controller indicating that the tag has been read, the controller may signal to the operator that the label is ready for removal from the device. Depending upon various other desires of the users, various other functions that would allow the sensors to be overridden may also be utilized.

In one embodiment of the invention, a specialized label is configured for use in the invention. Such a label contains a darkened portion, preferably a strip that is configured to obscure an optical sensor thus increasing the chance that these labels will activate the sensor when placed in the appropriate position over the sensor. The sensor is preferably tunable so as to be triggered when light of a particular wavelength is obscured. This modifiability also assists in increasing the sensitivity of the device itself. In the preferred embodiment of the invention the labels which are utilized in the present invention are approximately 1" in width and 4½" in length and are interconnected by tabs which extend between the individual labels and allow these labels to be separated from one another. In one particular preferred embodiment the labels have a pre-applied adhesive, which may or may not require a removable backing or liner. The aforementioned illustrations of various embodiments and configurations of the labels utilized in the present invention are intended as being illustrative only and should not be interpreted as being limiting as to the size, shape or configuration of the labels dispensed or described in the present invention. The method and system described in the present application are not dependent upon any particular type of tag or label and should not be interpreted as requiring such.

The tags which are utilized with the present invention are preferably embedded into labeling materials which can be read in either electronic or printable form. However, it is to be understood that the invention is in no way limited to this form. In other embodiments serialized or raw RFID tag inlays may also be used. The dispenser of the present invention dispenses and reads these items and by so doing allows individual tags to be isolated, selected, programmed, verified or any of a variety of other actions may also be performed. The preferred embodiment of the invention is made of inexpensive parts, which allow the device to be manufactured cheaply and used in a broad range of applications.

The purpose of the foregoing Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention, which is measured by the claims, nor is it intended to be limiting as to the scope of the invention in any way.

Still other features and advantages of the present invention will become readily apparent to those skilled in this art from the following detailed description describing only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

DESCRIPTION OF THE PREFERRED EMBODIMENTS

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present invention is a device for dispensing and reading labels that contain an RFID tag. As discussed previously, the use of the term "reading" is intended to cover all interactive activities that take place between an RFID tag and an RFID interrogator such as reading, writing, coding, interrogating, activating, deactiviting, selecting, de-selecting, and any other action that can take place between a reader and a tag. FIGS. 1-7 of the present invention show various features of the present invention including the device as well as the method that can be employed utilizing the device of this invention.

Figure 1:
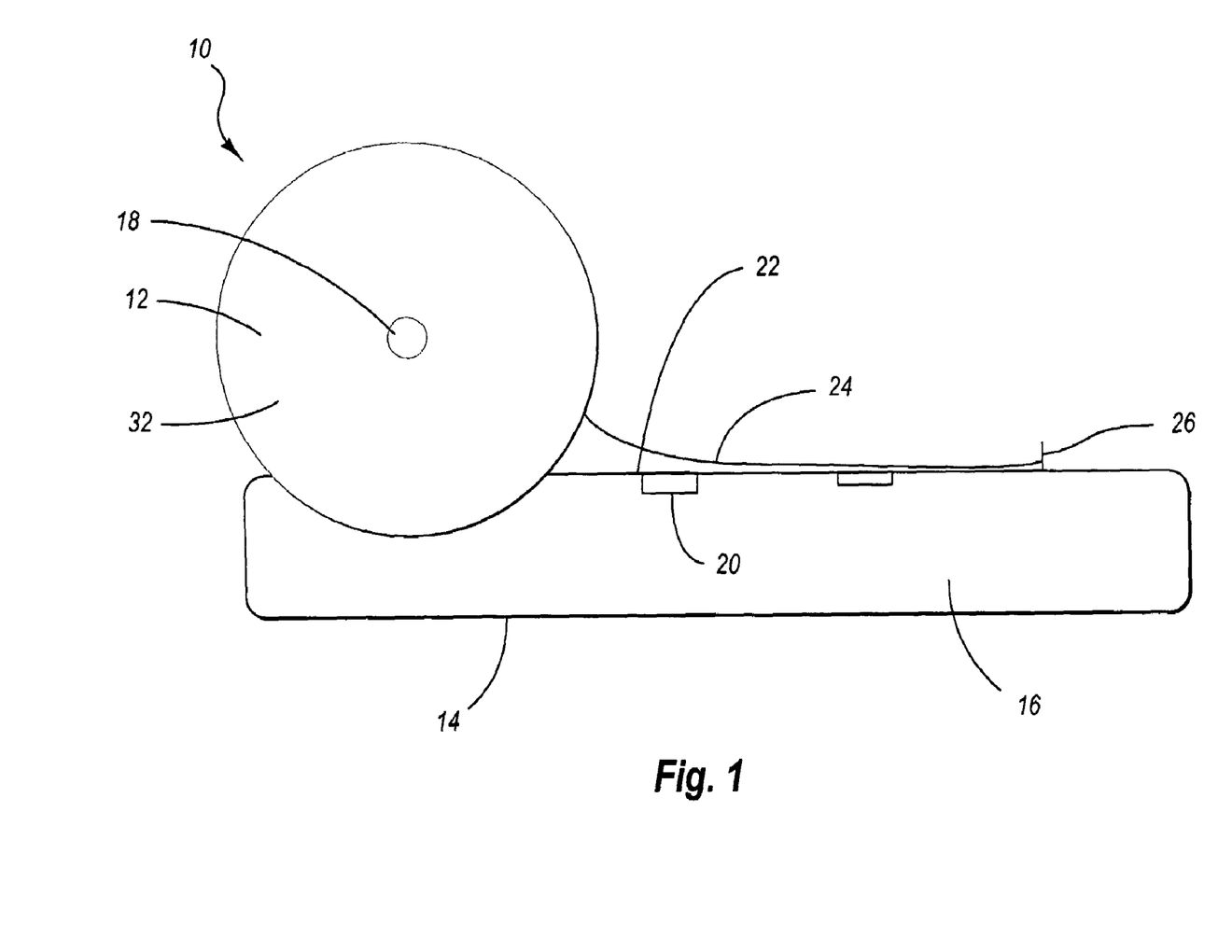
FIG. 1 shows a side view of the present preferred embodiment of the present invention.

Referring now to FIG. 1, a side view of the present invention of the embodiment is shown. The present invention is comprised of a label dispenser 12 and an RFID reader/writer 16, which are operatively interconnected. In one embodiment of the invention the label dispenser 12 and the RFID reader/writer 16 are interconnected within the same housing 14. In other embodiments of the invention 12, these parts are selectively separable so as to allow them to be alternatively separated or interconnected depending upon the particular necessities of the user.

The label dispenser portion 12 of the device 10 defines a storage portion 32 area which is configured to hold a pre-selected bulk quantity of labels, preferably in a roll form. However, depending upon the particular necessities of a user these bulk quantities of labels can be stored and dispensed in a variety of other ways as well. A label dispensing device 12, which is preferably an electrically motorized device acts, when directed, either by a host controller or by manual activation, to move a label from the storage portion 32 of the labeling device 12 toward the RFID reader/writer portion 16 of the invention 10. Upon arriving at a pre-designated location a sensor 20 is activated thus signaling the feed mechanism 18 to stop moving the label out of the device 10. The positioning of this sensor 20 is selected so that the embedded RFID tag is positioned in the optimum location for RFID reading. If so desired, the sensor 20 can also be utilized to ensure that the label is in a desired designated position for cutting or removal of the individual label from the bulk of labels.

In the preferred embodiment of the invention, the sensor 20 is an optical sensor that is tunable so as to allow modifications for use in various environments and with various forms of lights and wavelengths. While the preferred version of the embodiment is described as utilizing an optical sensor, it is to be distinctly understood that the invention is not limited thereto but may be variously embodied to include a variety of other types of devices as well.

To facilitate the movement of a label from the storage portion 32 of the device and to ensure that a label will pass over the desired sensor 20, a chute 22 is defined within the housing 14 of the device. In the preferred embodiment of the invention the chute 22 is covered by a cover 24, which covers all or a portion of the chute 22 which defines the path through which the label will pass. In some embodiments of the invention a cutter 26 may also be positioned at desired, designated locations along this path. The sensor 20 is placed at a designated and desired position so as to accommodate various movements and locations of this device.

When directed, the label dispensing mechanism, within the label dispenser 12 is activated either directly by the feed button 18 on the device or by input from a controller. When activated, the label dispensing mechanism causes a label to be moved out of the storage area and into the chute 22. The label moves down the chute 22 or passageway until it passes by a sensor 20, which is positioned at a designated location. Upon arriving at this sensor 20, the sensor is activated and the reading of the RFID tag which is located within the label may then commence. When the read of the tag has taken place an announcement or is then made which signals the operator that the tag is complete and can be removed. If this tag is not removed, then no other actions with regard to the dispensing of this or any other tag may take place.

While one embodiment of the present invention is shown wherein the label dispenser 12 and the RFID reader/writer 16 are interconnected within the same housing, it is to be distinctly understood that this is merely one embodiment of the invention. In addition to such a configuration the label dispenser 12 and the RFID reader/writer 16 may be separately powered and variously interconnectable and interchangeable. The RFID reader/writer 16 of the present invention may be powered through a communication device such as a USB cable while the label dispenser 12 may be separately powered through a portable battery or other power transfer means. In addition, these devices may be utilized either together or separately.

In one embodiment of the invention, wherein the label dispenser 12 and the RFID reader/writer 16 have been interconnected into a portable ruggedized housing and these components have dimensioned for portable use the delivery of power to these devices may be varied according to the particular needs of the user.

Figure 2:
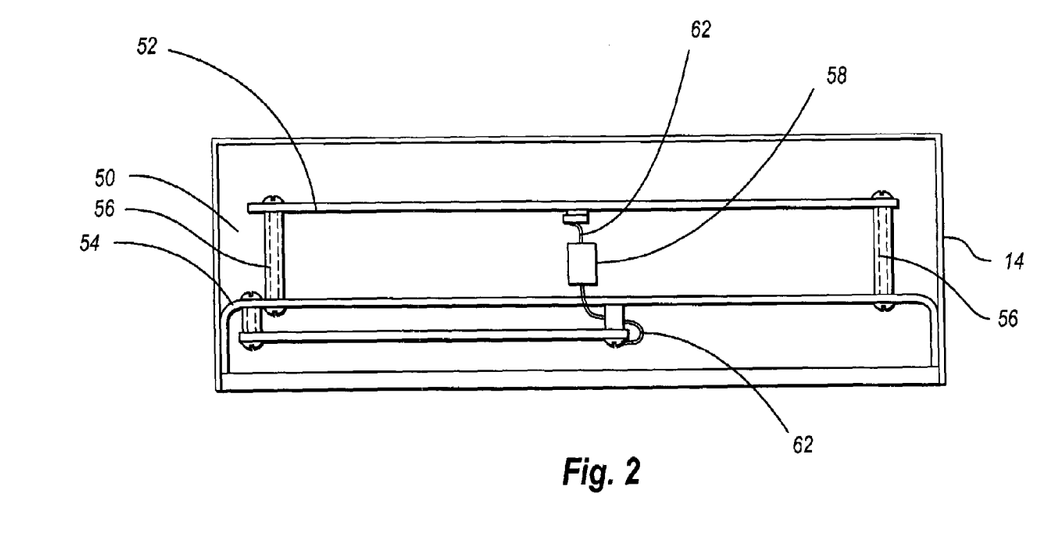
FIG. 2 is a cut away side view of the reader/writer portion of the embodiment shown in FIG. 1.
Figure 3:
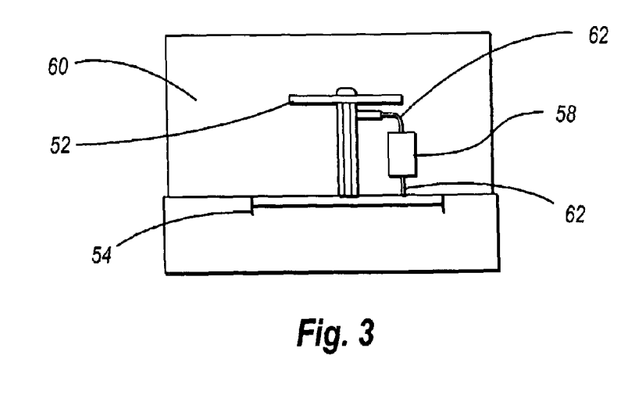
FIG. 3 is an end view of the embodiment shown in FIG. 2.

FIGS. 2 and 3 show a view of the RFID reader/writer 16 which is typically located within a housing 14. Referring first to FIG. 2, a cut away side view of the antenna portion of the reader/writer of the present invention is shown. This is the portion over which an RFID tag is placed, and read. The antenna portion 50 contains an antenna assembly 52, which is enclosed within a thin metal frame 54. A set of spacers 56 suspends a portion of the antenna assembly over the thin metal frame and helps to space the various portions of the antennae 52 within this box. A pair of coaxial cable portions 62 interconnected through a ferrite bead 58 serves to interconnect various portions of the device. As is shown in FIG. 3, this entire assembly is encased within a foam block 60 which is in turn encased within a preferably plastic housing 14.

Figure 4:
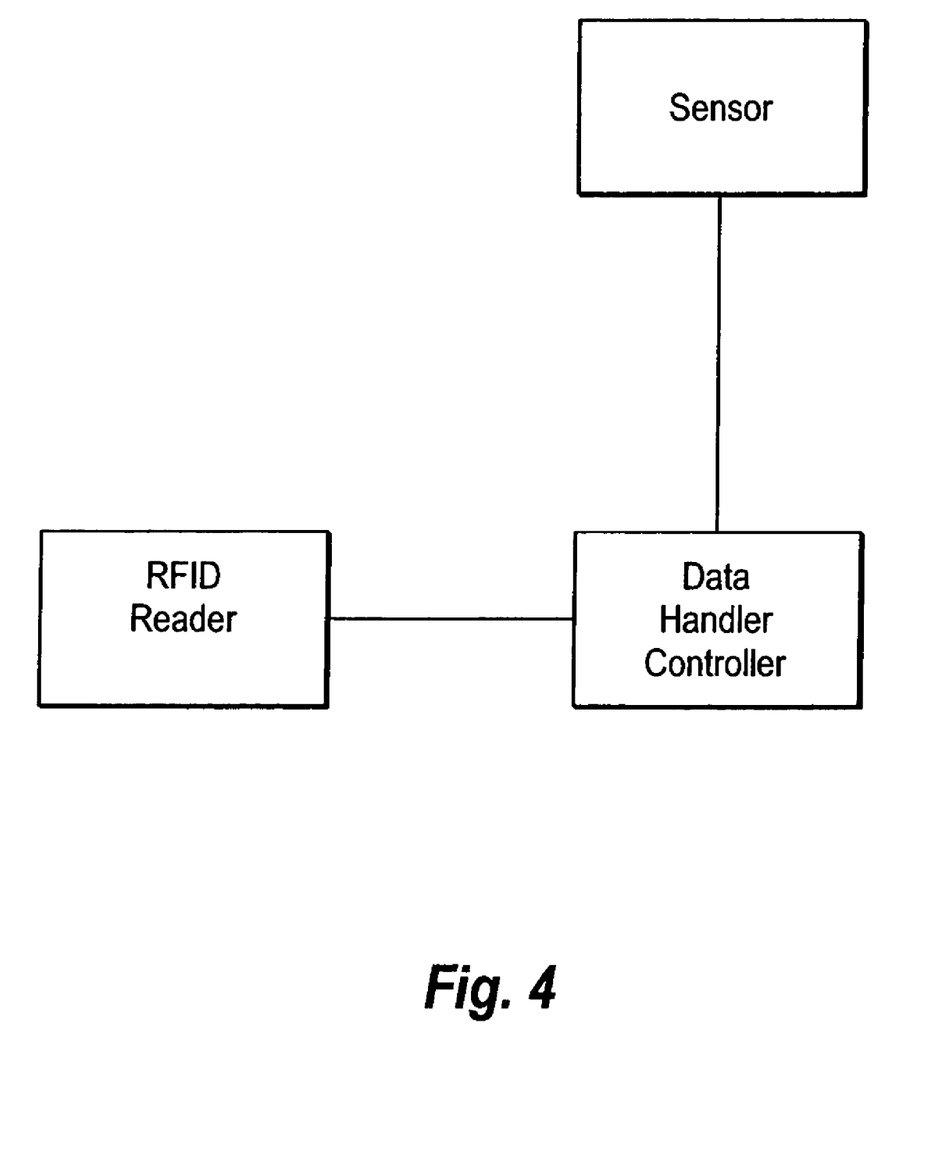
FIG. 4 is a conceptual diagram showing the interconnection between the various components of the present invention.

FIG. 4 shows the functional interaction of the hardware features of one of the preferred embodiments of the present invention. Preferably, the present invention includes the label dispenser and a RFID reader/writer 16. Other features may also be operatively connected to this device such as a host controller, having a data handler, an information processing device which enables the exchange of information between the various other pieces of the present invention, and a cutter configured to cut a single label from the bulk of labels from which the single label originates.

In one embodiment of the invention, the label dispenser 12 and the RFID reader device 16 are both operatively coupled to a host controller. While a sensor is also shown as being operatively connected to the host controller, in the preferred embodiment of the invention, this sensor is physically integrally connected to the reader. In one embodiment of the invention the RFID/reader writer of the present invention obtains both power and information from the host computer through the USB port.

In the preferred embodiment of the invention, the RFID reader/writer or interrogator 16 programs an RFID tag, which is embedded within a particular label. This is most preferably done according to the following steps. After being dispensed from the storage portion of the device 32, the RFID tag passes over the sensor 20. The sensor 20 recognizes the presence of a printed label and activates the RFID reader device 16 to make contact with or "read" the RFID tag, which is embedded within the label. Depending upon the configuration of the tag and the desired actions of the user a variety of actions may take place. These actions may include reading the tag, writing to the tag, activating the tag, turning the tag off, deactivating the tag from responding to a particular signal or any one of a variety of other functions. After one of these functions has been performed, the written tag is then verified to ensure that the information was appropriately recorded upon the tag and that the tag is functional. If all of these steps take place, then the tag and the label are appropriate for functional use and can be utilized.

If however at the initial RFID reading stage, the read is unsuccessful despite multiple read attempts, an error message is displayed and the operator is provided with the option of aborting the attempts or retrying the read. In the event that these subsequent attempts are unsuccessful, these same options are continually made available to the user.

If however, the information is successfully written to the tag, this information is verified. If the verification process verifies that the tag reads back the information which was originally written upon it, the process is complete. The dispensing system signals to a user that the tag of the invention may be removed. If the label is subsequently removed, then the device is enabled to process another tag and label. If however no such movement occurs, then no further labels are dispensed.

The present invention utilizes simple parts which can be cost-effectively combined and utilized to achieve these ends and provides an easily installable method and device for performing these functions. The present invention may be embodied in a variety of ways depending upon the particular circumstances of the parties who would be in need of the device. For example in one embodiment of the invention the dispenser portion and the RFID reader/writer 16 are selectively connectable so as to function independently of one another as well as together when interconnected. In another embodiment of the invention, the dispenser portion and the RFID reader/writer 16 are not only functionally interconnected, but are also physically combined into the same housing. In addition, this housing 14 may be a ruggedized, reinforced housing that is dimensioned and adapted for portable use and in some cases even attachment to a user's article of clothing or other device so as to enhance its portability. In such an embodiment the reader and the dispenser are powered by an internal power source such as a portable battery.

Figure 5:
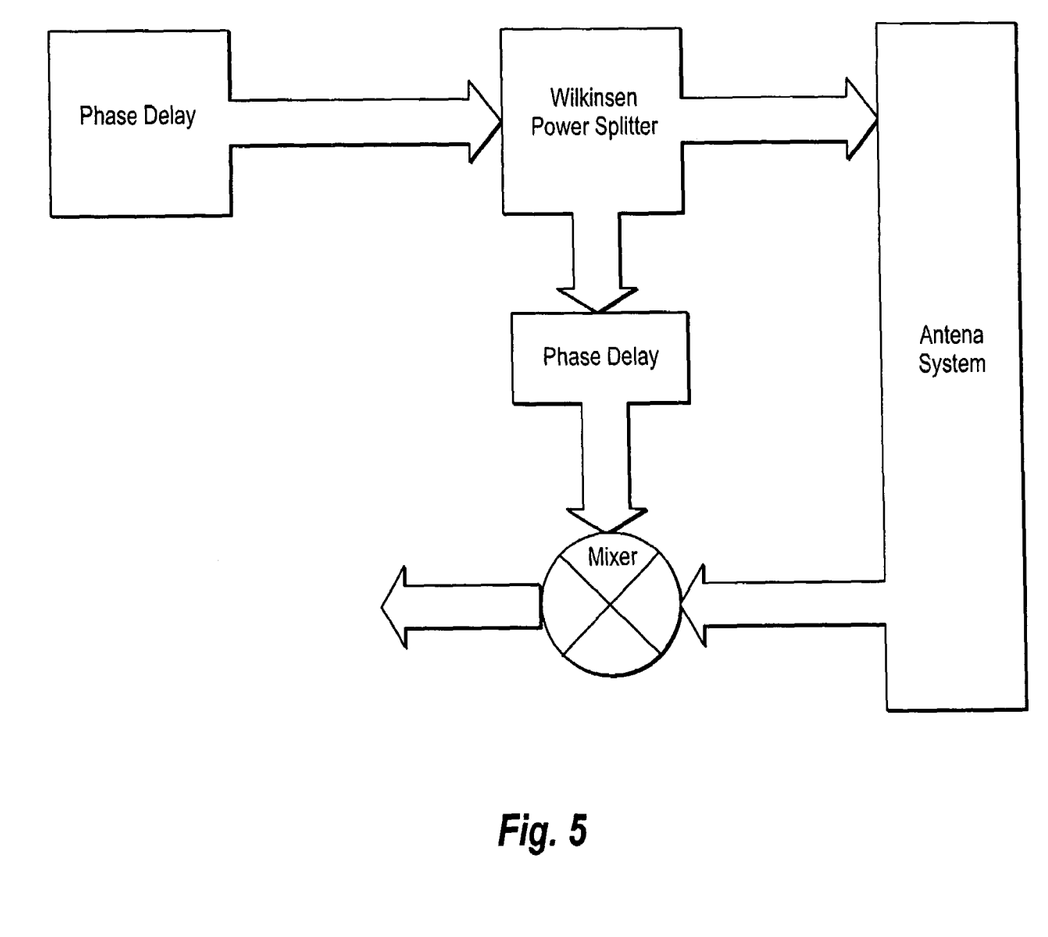
FIG. 5 is a basic conceptual diagram of the RFID reader/writer device that is utilized in the present invention.
Figure 6:
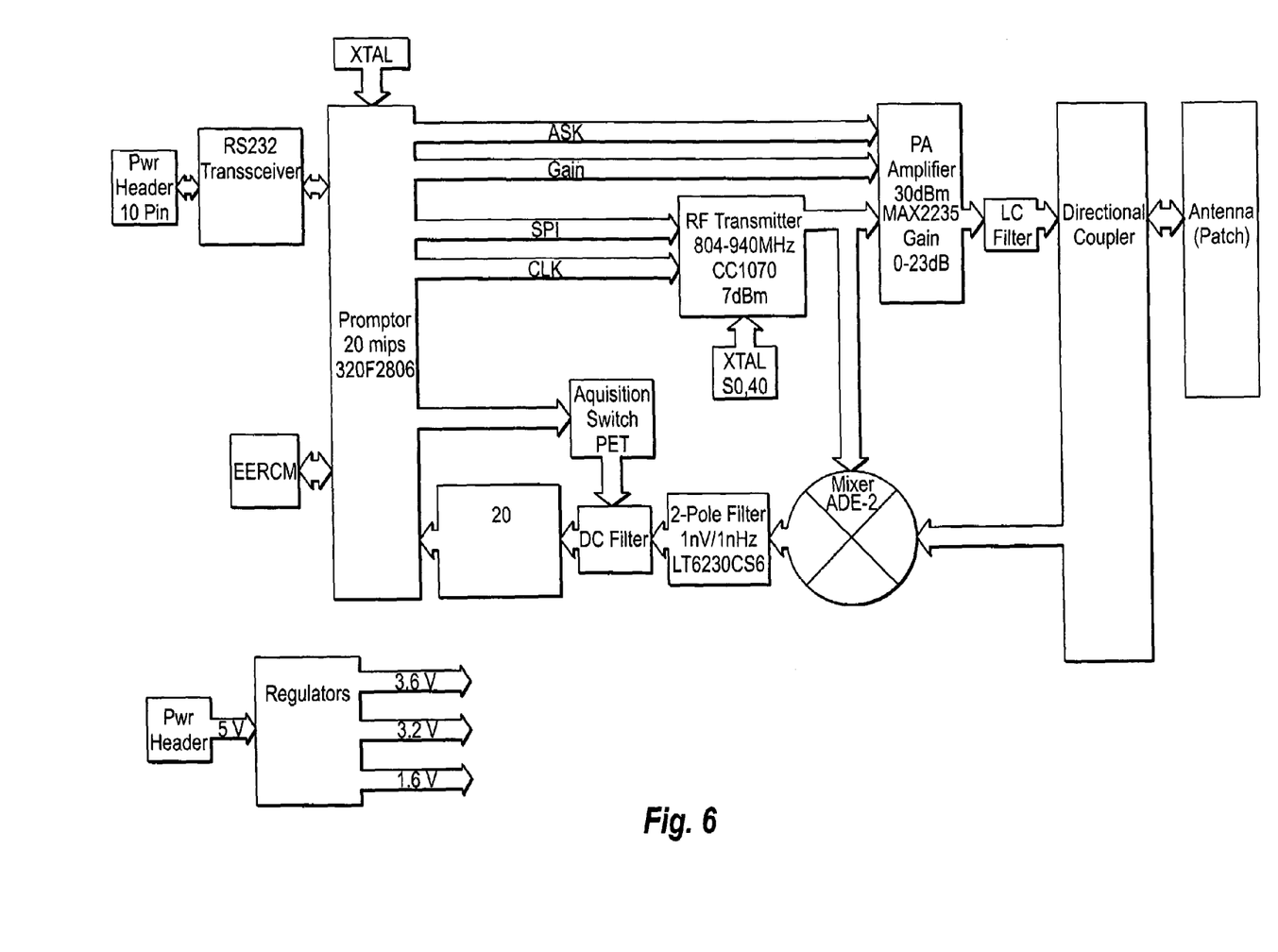
FIG. 6 is an operational diagram of the parts of the RFID reader/writer that is utilized in the present invention.
Figure 7:
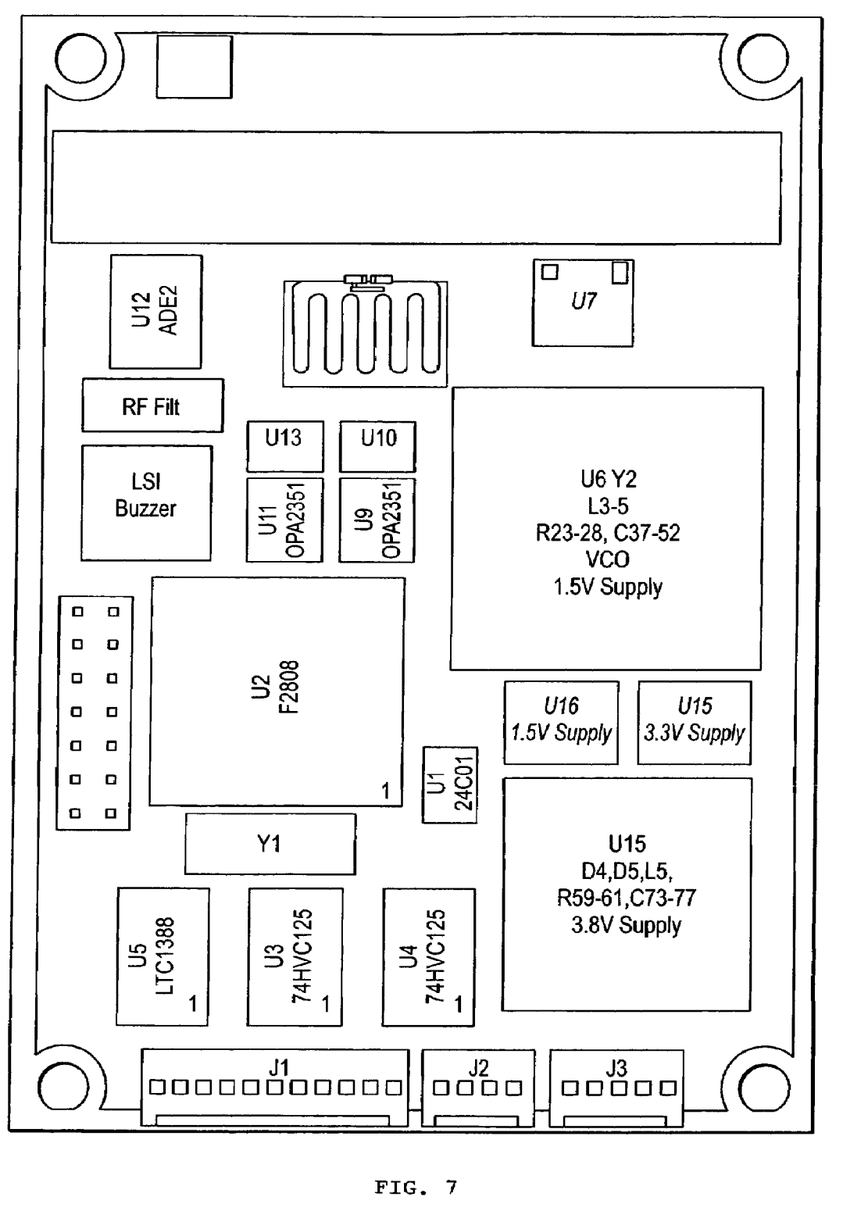
FIG. 7 is a cut away top view of the principal functioning parts of the reader/writer portion of the present invention.

FIG. 5 shows the generalized configuration of the RFID reader/writer which is utilized in the present invention, while FIG. 6 shows the preferred listing of pieces which are involved in the reader writer of the present invention and FIG. 7 shows the generalized layout of these pieces in the actual preferred embodiment of the present invention.

Referring first to FIG. 5, a generalized configuration of the preferred RFID reader writer which is utilized in the present invention is shown. In the preferred embodiment of the invention the RFID reader/writers preferably contains a controller which is directly operatively connected to an RF transmitter, an amplifier, an acquisition switch and a transceiver. These basic pieces provide a low cost reader configuration which allows these devices to be utilized in closely spaced applications, such as in conjunction with a label dispenser. The homodyne receiver mixes the RF signal directly to the baseband by operating the (LO) local oscillator at the transmit frequency. This synchronization and carrier rejection is accomplished by using a DC acquisition filter under the control of a high-speed microcontroller. By synchronizing the acquisition filter with the transmit modulation the DC level can be subtracted from the signal prior to the baseband amplifier, effectively providing a fast acquisition band pass-filter at the signal modulation frequency. Preferably, this local oscillator has sufficiently low phase noise so as to provide an adequate noise floor to reliably demodulate backscatter signal.

The controller contains an integral voltage current oscillator (VCO) which is controlled by the controller and minimizes low phase noise. An RF amplifier provides power into the antenna system. A microstrip directional coupler provides signal isolation and minimizes transmit insertion loss. A mixer converts the RF signal directly to baseband in a simple homodyne configuration. This configuration allows for signals to be sent and received by this reader in a way that is functionally proficient and which also can be done with components that are of sufficiently low cost so as to lower the costs of the RF readers and allow RF tags to be used in a variety of industries and with a variety of products which were previously unobtainable due to these cost restraints.

In the preferred embodiment of the invention, the RFID reader/writer or interrogator as it is called at times is a homodyne type of receiver and transmitter which is made up of a single channel RF oscillator that is operatively connected to a power-splitter. This power-splitter propagates output from the RF oscillator to both the antenna system as well as to a mixer. This configuration provides a significant advantage over the prior art in that this device allows for the carrier and the local oscillator to each operate at the same frequency. The present invention is intended for use in an application wherein the reader functions at a distance of between zero and six inches from the tag.

The output mixer of the reader is filtered and buffered to provide a baseband signal with a low impedance drive. The baseband amplifier will provide a gain to be sampled by the integral A/D converter and subsequently processed by the microcontroller. This microcontroller also provides a variety of other functions such as acting as a slicer to filter, edge detect and decode messages received from the tags. The receiver mixes the RF signal directly to the baseband by operating the local oscillator at the transmit frequency. Using a DC acquisition filter under the control of a high-speed microcontroller prevents high-speed rejection. By synchronizing the acquisition filter with the transmit modulation, the DC level associated with the carrier can be subtracted from the signal prior to the baseband amplifier, effectively providing a fast acquisition band-pass filter at the signal modulation frequency.

Detailed views of the particular components of the reader/writer utilized in the present invention are shown in FIGS. 6 and 7 of the application. While this preferred embodiment is shown it is to be distinctly understood that the invention is in no way expressly limited thereto, but that the invention may also be reconfigured in a variety of other ways depending upon the needs of a particular user.

Referring first to FIG. 6, in this preferred embodiment of the invention, the controller in the reader/writer is a Texas Instruments 320 F2806 100 MIPS DSP Microcontroller. This device provides sufficient processing power to incorporate functionality that would otherwise require additional hardware circuitry. An EEPROM is functionally connected to the processor and stores configuration parameters. The RF transmitter is a Chipcon CC1070 single chip low power RF Transmitter. This device incorporates a frequency synthesizer which can operate in the 804-940 MHz range and is especially suited for narrow band systems providing RF data ranges of up to 153.6 kBaud. The main operating parameters of the device are easily programmed into the controller or the EEROM using an industry standard serial bus.

The integral variable current oscillator provides a very low phase noise of 103 dBc/Hz at 100 kHz by a MAX2235 RF amplifier providing up to 30 dBm of power into the antenna system. The microstrip directional coupler is designed to provide a minimum of 25 dB isolation with a maximum of 1 dB transmit insertion loss. The directional coupler has a high receive injection loss, however, there is more than sufficient backscatter in this short-range design. The antenna design can be varied for both remote and local operation on a maximum 12-inch coaxial antenna. The design is optimized in a tight pattern with minimal tag detuning effects.

A microcircuits ADE-2 mixer will be used to convert the RF signal directly to baseband in a simple homodyne configuration. This simple design will require the transmit path to be phase adjusted for maximum backscatter at the nominal antenna to tag distance. This will avoid nulls over specified antenna to tag separation paths. The output mixer will be filtered and buffered to provide a baseband signal with a low impedance drive. The subsequent DC acquisition circuit will acquire and subtract the DC level resulting from the isolated carrier. The baseband amplifier will provide a gain on the order of 500 providing a nominal signal between 0.125 and 2 Volts to be sampled by the integral A/D converter and subsequently processing in the microcontroller. Power to the controller will be derived from provided 5 volts at 1.25 amps using a DC-DC converter and two low dropout regulators.

While the preferred embodiment is described above it is to be distinctly understood that the invention is not limited thereto but may be variously embodied according to the specific needs of a user. The preferred embodiment of the present invention is a homodyne receiver. This homodyne receiver mixes the RF signal directly to the baseband by operating the local oscillator at the transmit frequency. In one configuration of the invention, a double balanced mixer is used with quadrature components of the local oscillator to minimize the lulls encountered in multipath environments. However, in the preferred embodiment of the invention this extra circuitry is eliminated. In the preferred embodiment of the invention the tag is operated within a gap somewhere between 0 and 6 inches.

Signal clarification, specifically carrier rejection is accomplished using a DC acquisition filter under the control of the high-speed microcontroller. By synchronizing the acquisition filter with the transmit modulation, the DC level associated with the carrier can be subtracted from the signal prior to the baseband amplifier, effectively providing a fast acquisition band-pass filter at the signal modulation frequency.

The reader/writer of the present invention utilizes simple parts, which can be cost-effectively combined and utilized to obtain a reader/writer for use in achieving these ends, and provides an easily installable method and device for performing these functions. While a general description of the device described in the present invention is set forth above, it is to be distinctly understood that various modifications of these features may be required based upon the types of tags which are utilized in the labels that are used in conjunction with the present invention.

In the preferred embodiment of the present invention the tags which may be utilized may be naked tags which are dispensed from the dispenser or the tags may be embedded tags which are placed within a printable or readable label. An example of such a label would have a first side configured to be printed upon and a second side which contains an adhesive which would allow these labels to be affixed to an item after this label is printed. A removable coating portion covers this adhesive portion and allows the labels to be stored in a roll type of form. Preferably these individual labels are separated by perforations, or cuts within the paper which allow the paper to be held together by two perforated tabs which interconnect the various labels. As described previously, when using an optical sensor it is advantageous to provide a darkened strip of material so as to assist the scanner in determining when the label is appropriately positioned upon the device. The particular type of RFID tag which is utilized in these labels may be any type of tag that is currently known or which may be developed after the filing of this application. The particular type of tag that is used in the present invention is not a crucial feature of the present invention. The use of any particular tag may therefore require various modifications and adjustments to the RFID Reader/Writer 16.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A labeling device for dispensing and reading labels containing RFID tags said labeling device comprising:
    an RFID reader/writer comprising: an oscillator and a power splitter operatively connected between said oscillator and an antenna system, said power splitter further operatively connected to a mixer, said power splitter configured to receive input from said oscillator and to transmit a signal to said antenna system and to said mixer, said mixer configured to receive input from said oscillator through said power splitter and input from said antenna system and to transmit a signal to another location; and
    a label dispenser operatively connected to said RFID reader/writer, whereby the movement of labels and the reading and writing of the RFID tags within these labels are coordinated according to a preselected schedule.

2. The labeling device of claim 1 wherein said dispenser comprises:
    a storage portion configured to hold a preselected quantity of labels therein, each of said labels containing an RFID tag;
    a feed mechanism, said feed mechanism configured to move a label from said storage portion to a processing location; and
    a sensor, said sensor configured to sense when a label is in a pre-designated position, and to send a signal to said RFID reader writer.

3. The labeling device of claim 2 wherein said body further defines a chute, said chute defining a path wherein said labels travel from said dispenser to said RFID reader/writer.

4. The labeling device of claim 3 further comprising a cover adapted to cover said chute, said cover configured to hold a label within said chute while said label passes under said cover within said chute.

5. The labeling device of claim 1 wherein said RFID reader/writer is powered through a USB cable.

6. The labeling device of claim 1 further comprising a cutter, said cutter adapted to cut a selected programmed label from a bulk embodiment of labels.

7. The labeling device of claim 1 wherein said RFID reader/writer and said label dispenser are integrally connected within a single housing.

8. The labeling device of claim 7 wherein said housing is a ruggedized housing, which further comprises a compartment adapted to receive and hold a portable power source therein.

9. The labeling device of claim 1 wherein said RFID reader/writer and said label dispenser are selectively separable and interconnectable.

10. A labeling device for dispensing and reading labels containing RFID tags said labeling device comprising:
    a label dispenser, said label dispenser further comprising a body said body having a storage portion configured to hold a preselected quantity of printable labels therein, each of said labels containing an RFID tag; a feed mechanism, said feed mechanism configured to move a label from said storage portion to a processing location; and a sensor, said sensor configured to sense when a label is in a pre-designated position, and to send a signal to an RFID reader writer,
    said RFID reader writer having an oscillator; a power splitter operatively connected between said oscillator and an antenna system, said power splitter further operatively connected to a mixer, said power splitter configured to receive input from said oscillator and to transmit a signal to said antenna system and to said mixer; said mixer configured to receive input from said oscillator through said power splitter and input from said antenna system and to transmit a signal to another location.

11. The labeling device of claim 10 wherein said RFID reader/writer and said label dispenser are integrally connected within a single housing.

12. The labeling device of claim 11 wherein said body further defines a chute, said chute defining a path wherein said labels travel from said dispenser to said RFID reader/writer, said labeling device further comprising a cover adapted to cover said chute, said cover configured to hold a label within said chute while said label passes under said cover within said chute.

13. The labeling device of claim 12 wherein said RFID reader/writer device is powered through a USB cable.

14. The labeling device of claim 10 wherein said RFID reader/writer and said label dispenser are selectively separable and interconnectable.

* * * * *